(12) United States Patent
Ayyar et al.

(10) Patent No.: US 8,535,163 B2
(45) Date of Patent: Sep. 17, 2013

(54) LOW-FRICTION SYNCHRONOUS INTERACTION IN MULTIPLAYER ONLINE GAME

(75) Inventors: Kartik Ayyar, San Francisco, CA (US); Revant Kappor, San Francisco, CA (US); Kevin Dressel, Pacifica, CA (US); Chris Antimary, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/347,265

(22) Filed: Jan. 10, 2012

(65) Prior Publication Data
US 2013/0178281 A1    Jul. 11, 2013

(51) Int. Cl.
*A63F 9/24*            (2006.01)
(52) U.S. Cl.
USPC .......... 463/42; 463/7; 463/9; 463/23; 463/39; 463/41; 463/43
(58) Field of Classification Search
USPC ............................ 463/16, 23, 39–43, 7–9, 20
See application file for complete search history.

(56) References Cited

U.S. PATENT DOCUMENTS

| | | | |
|---|---|---|---|
| 7,572,187 B2 * | 8/2009 | Van Luchene | 463/42 |
| 8,075,404 B2 * | 12/2011 | Stamper et al. | 463/42 |
| 2013/0005471 A1 * | 1/2013 | Chung et al. | 463/42 |

\* cited by examiner

*Primary Examiner* — Sunit Pandya
(74) *Attorney, Agent, or Firm* — Martine Penilla Group, LLP

(57) ABSTRACT

Methods for low-friction synchronous interaction in multiplayer online games are presented. In one method, a social grid with relationship information is accessed, and a first and a second game boards are executed for a first and a second user, respectively. The first and second boards are managed by the first and the second users, respectively, the social grid including a social link between the first and second users. An assistance request, generated in the second game board, is presented in the first game board. Upon detection of an acceptance of the request by the first user, an animation is generated in the second game board presenting an image sequence appearing as a first-user action in the second game board that completes at least one task associated with the request for assistance, where the action occurs without the first user accessing the second game board.

20 Claims, 15 Drawing Sheets

LOW-FRICTION SYNCHRONOUS INTERACTION IN MULTIPLAYER ONLINE GAME

BACKGROUND

1. Field of the Invention

The present invention relates to methods for playing online social games, and more particularly, methods, systems, and computer programs for low-friction synchronous interaction in multiplayer online games.

2. Description of the Related Art

Online games that allow players to interact with other players have become popular. Some online games, such as chess or bridge, have a small number of players that play together at the same time. Other online games, such as Massively Multiplayer Online (MMO) games, can have a large number of players playing simultaneously. Online game operators, also referred to as social game operators, harness the power of online social networks, to design games that closely integrate the players' social graph data with their existing friendship connections.

In social MMO games, players collaborate in order to play the game and make progress. However, interactions between players often take place asynchronously, and players are not aware in real-time when their friends are online. Furthermore, interactions between players tend to be burdensome, requiring a significant amount of effort and time to perform these interactions. For example, if the player whishes to visit a friend's farm, the game must exit the player's farm, load the friend's farm, perform game activities while in the friends farm, exit the friend's farm, and reload the player's farm. This substantial effort is an obstacle that hinders online game interactions. It is in this context that embodiments arise.

SUMMARY

Embodiments of the present invention provide methods, systems, and computer programs for low-friction synchronous interaction in multiplayer online games. In one embodiment, a method includes an operation for accessing a social grid with relationship information, and an operation for executing a first game board for a first user and a second game board for a second user. The first game board is managed by the first user and the second game board is managed by the second user, where the social grid includes a social link between the first user and the second user in the online game. A request for assistance to the first user is presented in the first game board, where the request is generated in the second game board. The method includes another operation for, upon detection of acceptance of the request by the first user, generating an animation in the second game board presenting a sequence of images that appear as an action performed by the first user in the second game board. The action occurs without the first user accessing the second game board, and the action performed in the second game board completes at least one task associated with the request for assistance. In one embodiment, the action further occurs without input by the first user to control the action in the second game board.

In another embodiment, a system for processing game operations during execution of an online game includes a live interaction server and a game server. The live interaction server establishes a synchronous mode of play when a first user and a second user play the online game at the same time. On the other hand, an asynchronous mode of play is established when the first user and the second user are not playing the online game at the same time. Further, the game server executes a computer program that performs a method, said method including an operation for executing a first game board for a first user and a second game board for a second user. The first game board is managed by the first user and the second game board is managed by the second user. The method further includes an operation for presenting a request for assistance to the first user in the first game board while in synchronous mode, where the request is generated in the second game board. Further yet, the method includes an operation for, upon detection of acceptance of the request by the first user, generating an animation in the second game board presenting a sequence of images that appear as an action performed by the first user in the second game board. The action occurs without the first user accessing the second game board, where the action performed in the second game board completes at least one task associated with the request for assistance.

In yet another embodiment, a method for processing game operations during execution of an online game includes an operation for executing a first game board for a first user and a second game board for a second user, where the first game board is managed by the first user and the second game board is managed by the second user. A visual indicator is executed, i.e., presented, in the second game board to signal that the first user is active in the first game board, the visual indicator representing existence of a synchronous mode of play between the first user and the second user. In addition, the method includes an operation for presenting a request for assistance to the first user in the first game board, the request being generated in the second game board. The request for assistance is generated while in synchronous mode. Upon detection of acceptance of the request by the first user, an animation is generated in the second game board presenting a sequence of images that appear as an action performed by the first user in the second game board, the action occurring without the first user accessing the second game board. The action performed in the second game board completes at least one task associated with the request for assistance. At least one operation of the method is executed by a processor. In one embodiment, the action further occurs without input by the first user to control the action in the second game board. Still further, the action can be in the form of an animation of an avatar of the first user, which appears to the second user as if the first user was actually providing active participation and was actually controlling his or her avatar on the game board of the second user. Instead, however, the action is automatically executed without direction from the first user. In one embodiment, the action will take on a plurality of forms, each form defining a sequence of moves or interactivity by an avatar or by objects in the game board, such as a building, automobiles, helicopters, planes, trains, motorcycles, bicycles, or groups of avatars, or combinations thereof. Each of the plurality of forms will be selected from a lookup table dynamically, depending on the context of the game, or context of the social interactivity at any particular point in time.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process operations and structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

BRIEF DESCRIPTION OF THE DRAWINGS

The invention may best be understood by reference to the following description taken in conjunction with the accompanying drawings.

DETAILED DESCRIPTION

Methods, systems, and computer programs for low-friction synchronous interaction in multiplayer online games are presented. It will be apparent, that the present embodiments may be practiced without some or all of these specific details. In other instances, well known process operations have not been described in detail in order not to unnecessarily obscure the present embodiments.

Figure 1:
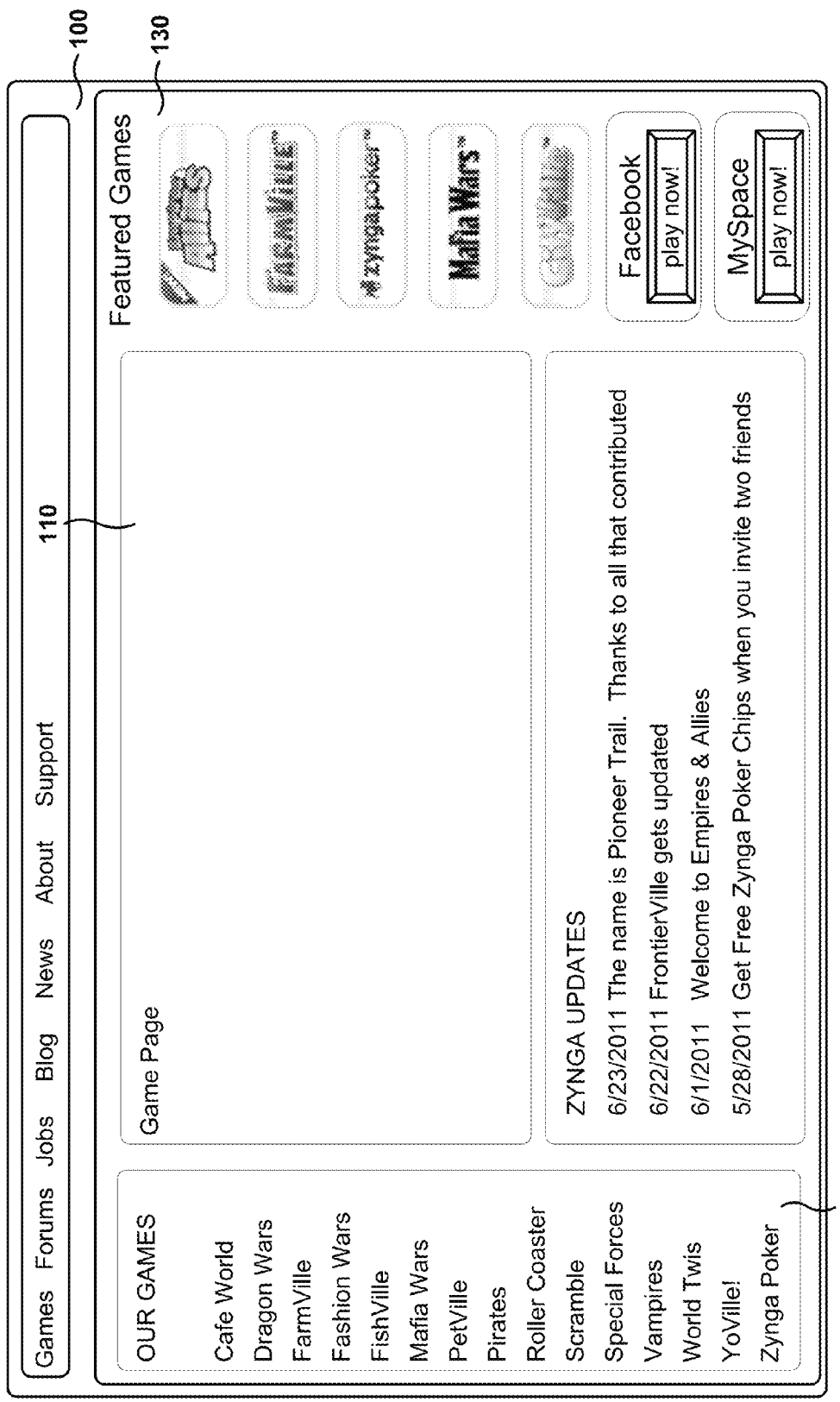
FIG. 1 illustrates an embodiment of a web page for playing an online game.

FIG. 1 illustrates an embodiment of a web page 100 for playing an online game. A web page is a structured document or resource of information that is suitable for a computer network, such as the World Wide Web, the Internet, or an Intranet. A web page is identified by a unique Uniform Resource Locator (URL) and may be accessed through a web browser and displayed on the screen of a network device.

Some web pages are dynamic and are constructed at the time the web page is requested by a network user. As a result, the actual content included in dynamic web pages may vary over time. In addition, web pages may include multimedia content (e.g., image, video, or audio), or embedded references thereto, as well as text content.

Web page 100 is one embodiment of a page designed for playing games online via web browsers. In this embodiment, a list of games 120 is presented for selection by the player, and a list of featured games 130 identifies popular games. In one embodiment, the game is played in game area 110 as an embedded component that may use any technology for presenting multimedia dynamic content, such as Hyper Text Markup Language 5 (HTML5), Adobe Flash®, etc.

Adobe Flash (formerly known as Macromedia Flash) is a multimedia platform for adding animation and interactivity to web pages. A Flash component (e.g., game area 110) may be embedded in a web page (e.g., web page 100) to create animation, advertisements, or games and to integrate video into the web page. Adobe Flash can manipulate vector and raster graphics and support bidirectional streaming of audio and video. In one embodiment, Adobe Flash libraries are used with the Extensible Markup Language (XML) capabilities of the web browsers to render rich content in the browsers. This technology is known as Asynchronous Flash and XML.

Another technology for displaying dynamic content in a web page is HTML5. HTML5's features include media playback and offline storage. With a predecessor version to HTML5, named HTML4, sites have to reach for Adobe Flash (or Silverlight) to show a video or play music. However, HTML5 lets sites directly embed media using HTML tags (e.g., "<video>" and "<audio>"), and plugins are not required.

In one embodiment, games include objects, such as characters, currencies, tools, assets, social relations, etc. For example, in a war game, the characters may be the soldiers fighting on respective sides of the war. In addition, there may be weapons used by the soldiers and objects around the battlefield (e.g., buildings, trees, animals, mountains, rivers, and so on). Each game object may be defined according to a predetermined syntax. For example, the definition of a game object may include shape, texture, physical capabilities, connection or relationship with other game objects, etc.

In another embodiment, a game application is embedded in a web page (e.g., web page 100) and the players play the game via web browsers. The display of a game is sometimes referred to as the "stage" of the game. Thus, the stage of the game may be implemented as Adobe Flash or HTML5 component embedded in the web page. For example, the stage is essentially a data structure that defines some of the basic elements of the game, such as aspect ratio and display size. At any given time, a game scene may be rendered and displayed on the stage by attaching one or more game objects to the stage.

Figure 2:
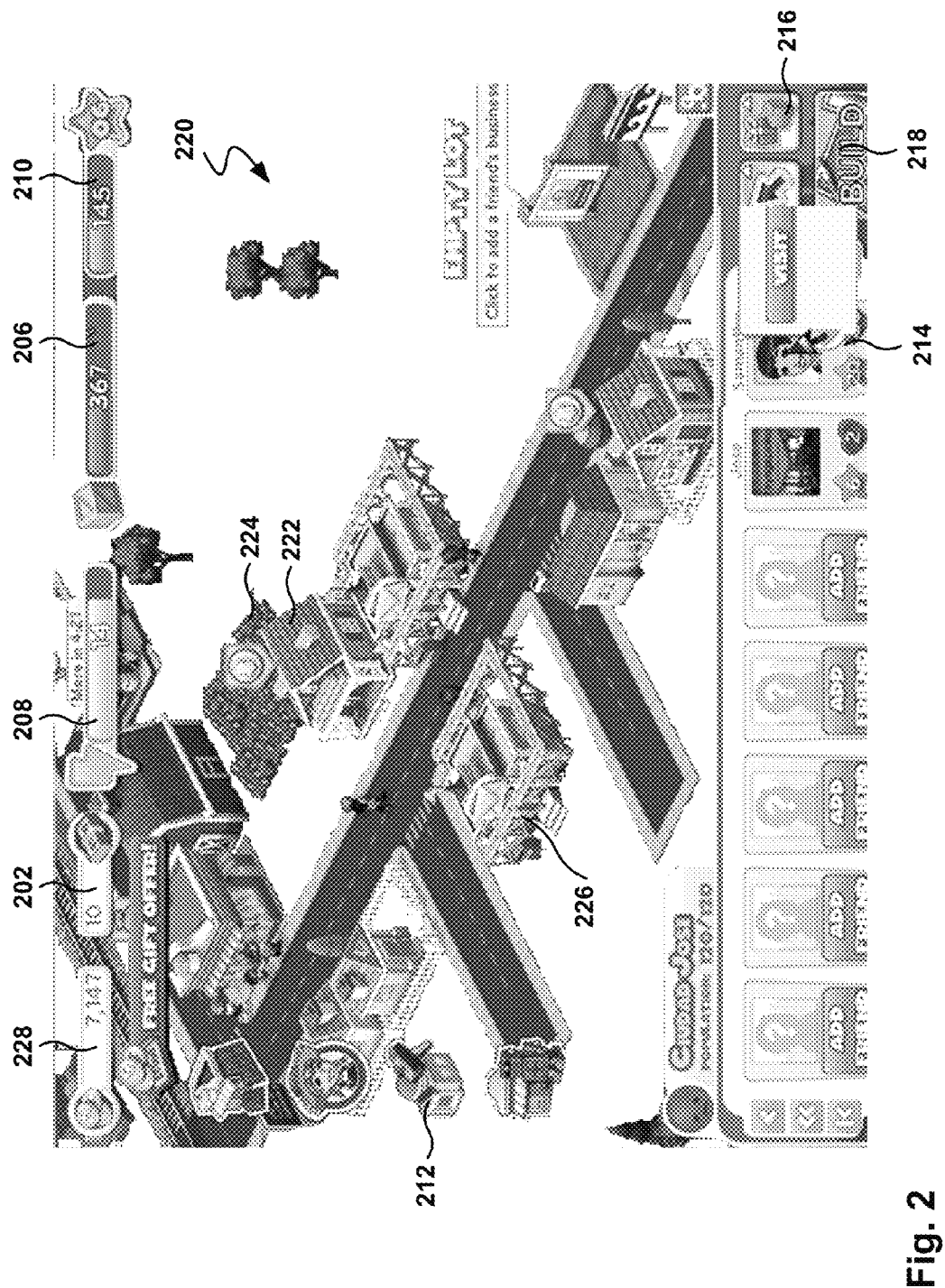
FIG. 2 shows the stage of an online game, according to one embodiment.

FIG. 2 shows the stage of an online game, according to one embodiment. The online game of FIG. 2 can be played in game area 110 of FIG. 1, but the online game can also be played in other environments. In one embodiment, the game includes a three-dimensional view 220 of a city that evolves as the player makes progress in the game. As the player advances in the game, the player acquires assets, which can take multiple forms. In one embodiment, assets include first virtual currency asset 202, second virtual currency 228, goods 206, energy asset 208, sheep building 222, crop asset 224, community building asset 226, badges, badge collections, temporally tiered levels, bonuses, promotions, penalties, digital content (e.g., image files, icons, audio files, video files), gifts, tokens, honor title, rewards, invitation permissions, avatars, rally points, diaries, footprints, trophies, competitions, engagement modes, user difficulty modes (e.g., novice, intermediate, expert), stars, medals, gems, pets, exploration quests, etc. Each asset can be used for one or more purposes. For example, first virtual currency 202 can be used during the game to make progress, also referred to herein as advancement. The first virtual currency 202 can be used to acquire assets (e.g., buildings or decorations), to remove an obstacle in the game (e.g., enabling progress that would otherwise be blocked), or to complete a task (e.g., finish decorating a house).

In particular embodiments, the first and the second virtual currencies are used for different purposes, although some assets may be bought with either of the currencies. The first virtual currency has higher purchasing value than the second virtual currency. For example the first virtual currency can unblock some obstacles in the game that the second virtual currency cannot. Although a small amount of first virtual currency might be given to the player as the game starts, a player needs to purchase more first virtual currency with real currency, also referred to herein as legal currency, real-world currency, or real cash. This provides a revenue stream for the online game provider.

In one embodiment, the online game includes missions 212, which identify one or more tasks that the player must complete before the mission is considered satisfied or finished. For example, a mission may require three tasks: chopping down a tree, feeding an animal, and planting an apple tree. Upon completion of the mission, the player is rewarded in some fashion, such as providing a new asset, increasing the amount of energy, getting more virtual currency, etc. As the player completes tasks and missions, the game score 210 is increased, and as the game score increases the experience level may also increase.

Clicking on inventory icon 216 causes the online game to display a list of all the items or assets owned by the player. In addition, clicking on build icon 218 takes the player to a virtual marketplace where assets (e.g., buildings) can be acquired. As described above, assets can be from within different categories such as buildings, decorations, housing, businesses, crops, trees, animals, energy, special items, weapons, etc. Each category includes a plurality of assets within the category. For example, the housing category includes a cottage, a town house, a family house, a suburban house, a country house, an apartment building, a ranch, etc. Some of the items within a category can be freely acquired by the player, while purchasing of some items can be blocked until certain game condition is met, such as reaching some score, finishing a mission, purchasing the ability to unblock the blocked item, etc.

In one embodiment, the online game is an online social game, which leverages social relationships between the player and other online game players socially linked to the player. For example, the player might add a neighbor 214 to the game by inviting a friend from a social networking site. A neighbor of a first player, as referred to herein, is a second player that has established a social relationship in the online game with the first player. The social relationship is typically established by having one player inviting the other player to become a neighbor, and then the other player accepting the invitation. Once the invitation is accepted, both players are "neighbors." A neighbor may also be referred to as a friend, a crew member, a "buddy," a partner, an ally, etc.

There are many types of online social networks run and maintained by various companies, and any one of these companies can provide access to social graph data. One such company, without limitation to others, may include Facebook. Once a friend accepts being a neighbor, a social relationship is established in the game where the game played by the player and the game played by the neighbor can interact with each other. For example, the player might visit the game board (e.g., city) of the neighbor and perform some game activities therein, and will be rewarded for doing so. Some of the missions in the game might include social activities that promote the interaction between players. For example, one mission might include planting tomatoes in the neighbor's farm. Therefore, the social interaction can provide advancement for the player and for the neighbor.

In one embodiment, a game board is created the first time the player plays the online game. The game board can be a city, a farm, a forest, an island, etc., and the game board may also be referred to as the player's world, environment, playground, etc. As the player makes progress in the game, the game board changes by adding assets (e.g., adding buildings, shops, clearing trees, land, etc.), or by removing obstacles (e.g., cutting down a tree). Each player manages her own game board, although other players linked to the player (e.g., neighbors) in the online game may help by visiting and performing activities in the neighbor's game board. In one embodiment, only the players socially linked to the owner of the game board can visit to perform game activities therein.

It is noted that the embodiments illustrated in FIG. 2 are exemplary. Other embodiments may utilize different assets, missions, social interactions, etc. The embodiments illustrated in FIG. 2 should therefore not be interpreted to be exclusive or limiting, but rather exemplary or illustrative.

Figure 3:
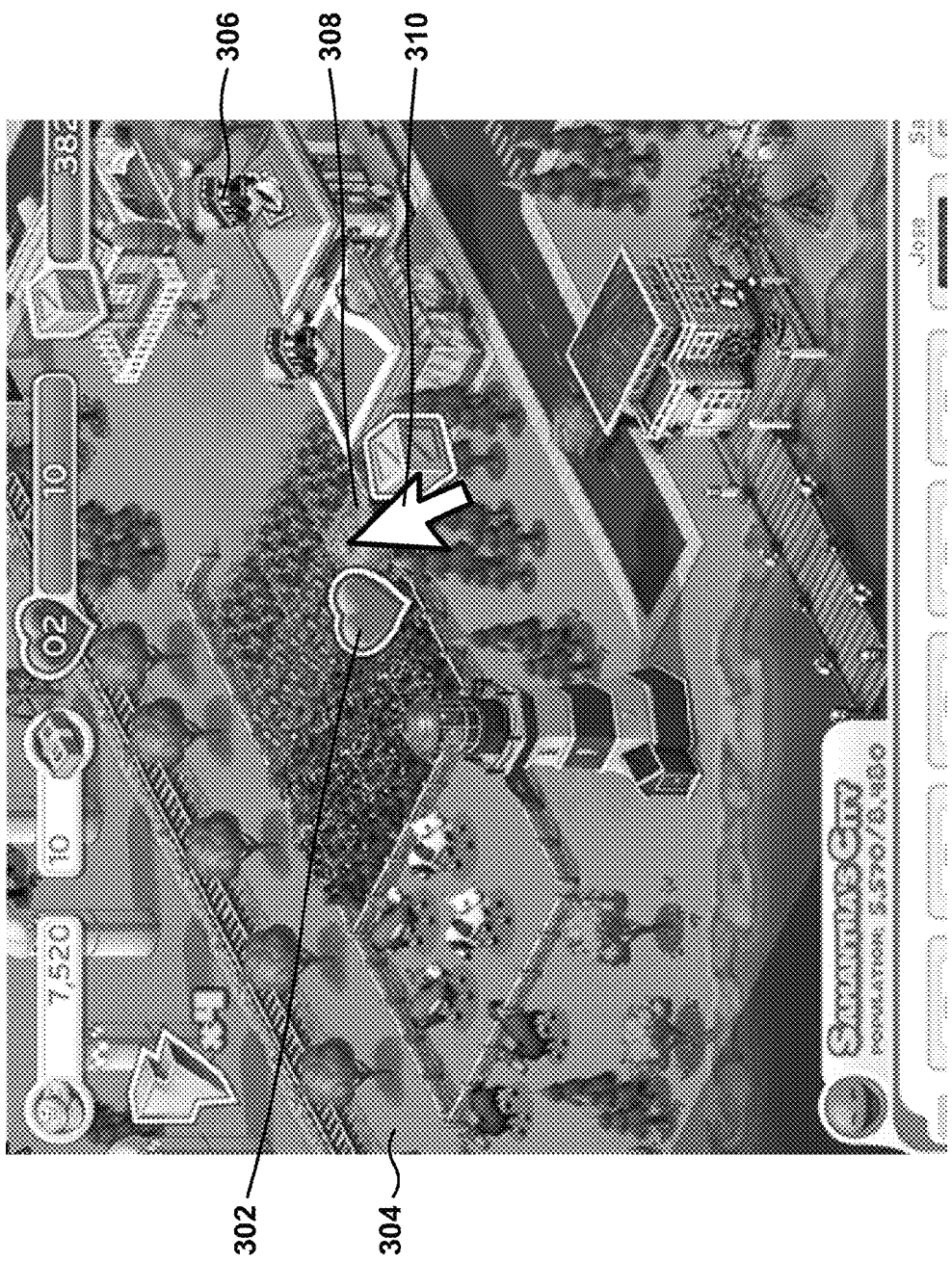
FIG. 3 shows a user visiting the game board of another user, according to one embodiment.

FIG. 3 shows a player visiting the game board of another player, according to one embodiment. When a player wishes to visit the game board of a neighbor, the player selects an option in the game to visit the neighbor. For example, clicking on the "visit" button next to the icon of player 214 in FIG. 2. The game loads the game board 304 of the neighbor, and the player is given certain options to interact with the game within the game board of the player. Typically, the interaction will create a benefit for the player and a benefit for the neighbor. In the embodiment of FIG. 3, the player is given the option of harvesting a crop, sending a bus tour 306, feeding an animal, etc. For example, if the player clicks 310 on crop 308, the crop is harvested and the player gets a reward 302.

It should be noted that the activities that player can perform while visiting a neighbor's game board may be similar to the activities that the friend may perform in her own game board. However, there may be some activities that the friend may perform while visiting and that the player cannot perform in her own game board, and vice versa.

As described above, this type of social interaction (e.g., a visit) may be burdensome for the player because it requires loading the neighbor's game board, and then re-loading the player's own game board upon the end of the visit. This is referred to as a "high-friction" interaction, because of the complexity and effort involved in the interaction. On the other hand, a "low-friction" interaction is an operation involving the game board of another player that requires only a small effort by the player. In one embodiment, a low-friction interaction may be performed while the player is in the player's game board, and without having to load the game board of the neighbor. This way, the player does not have to leave her own game. Some embodiments of low-friction interactions are described below in detail with reference to FIGS. 7-12.

Figure 4A:
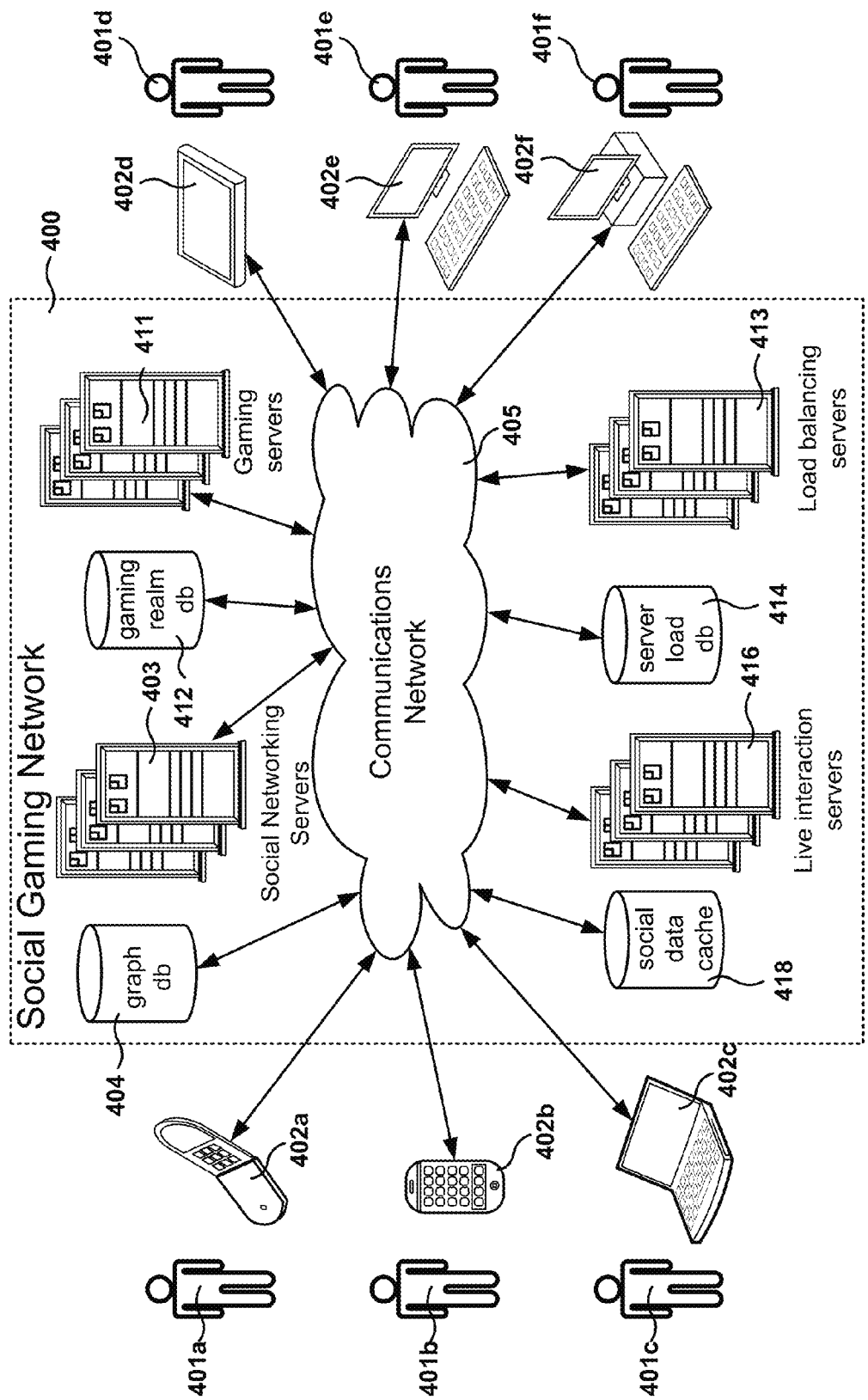
FIG. 4A shows a block diagram illustrating a social gaming network architecture, according to one embodiment.

FIG. 4A shows a block diagram illustrating a social gaming network architecture, according to one embodiment. In some implementations, a plurality of players (e.g., 401a-401f) may be utilizing a social gaming network 400. Each player interacts with the social gaming network via one or more client devices (e.g., client devices 402a-402f). The clients may communicate with each other and with other entities affiliated with the gaming platform via communications network 405. Further, the players may be utilizing a social networking service provided by a social networking server (e.g., social networking servers 403) to interact with each other.

When a player provides an input into the player's client device, the client device may in response send a message via the communications network to the social networking server. The social networking server may update the player profile, save the message to a database, send messages to other players, etc. The social gaming network may include a social graph database 404, which stores player relationships, social player profiles, player messages, and player social data.

The gaming servers 411 host one or more gaming applications, and perform the computations necessary to provide the gaming features to the players and clients. One or more gaming realm databases 412 store data related to the gaming services, such as the gaming applications and modules, virtual gaming environment ("realm") data, player gaming session data, player scores, player virtual gaming profiles, game stage levels, etc. The gaming servers may utilize the data from the gaming realm databases to perform the computations related to providing gaming services for the players. In some implementations, a server load database 414 stores gaming server load statistics, such as computational load, server responses times, etc.

The social gaming network may include one or more load balancing servers 413, and one or more live interaction servers 416. The live interaction servers 416 monitor which players are online, and determine if a player's neighbors are currently online. This allows live interactions between players, as described below in more detail with reference to FIG. 4B. In one embodiment, a social data cache 418 stores some of the graph data related to player game links (e.g., neighbors) for fast access to the social data.

Figure 4B:
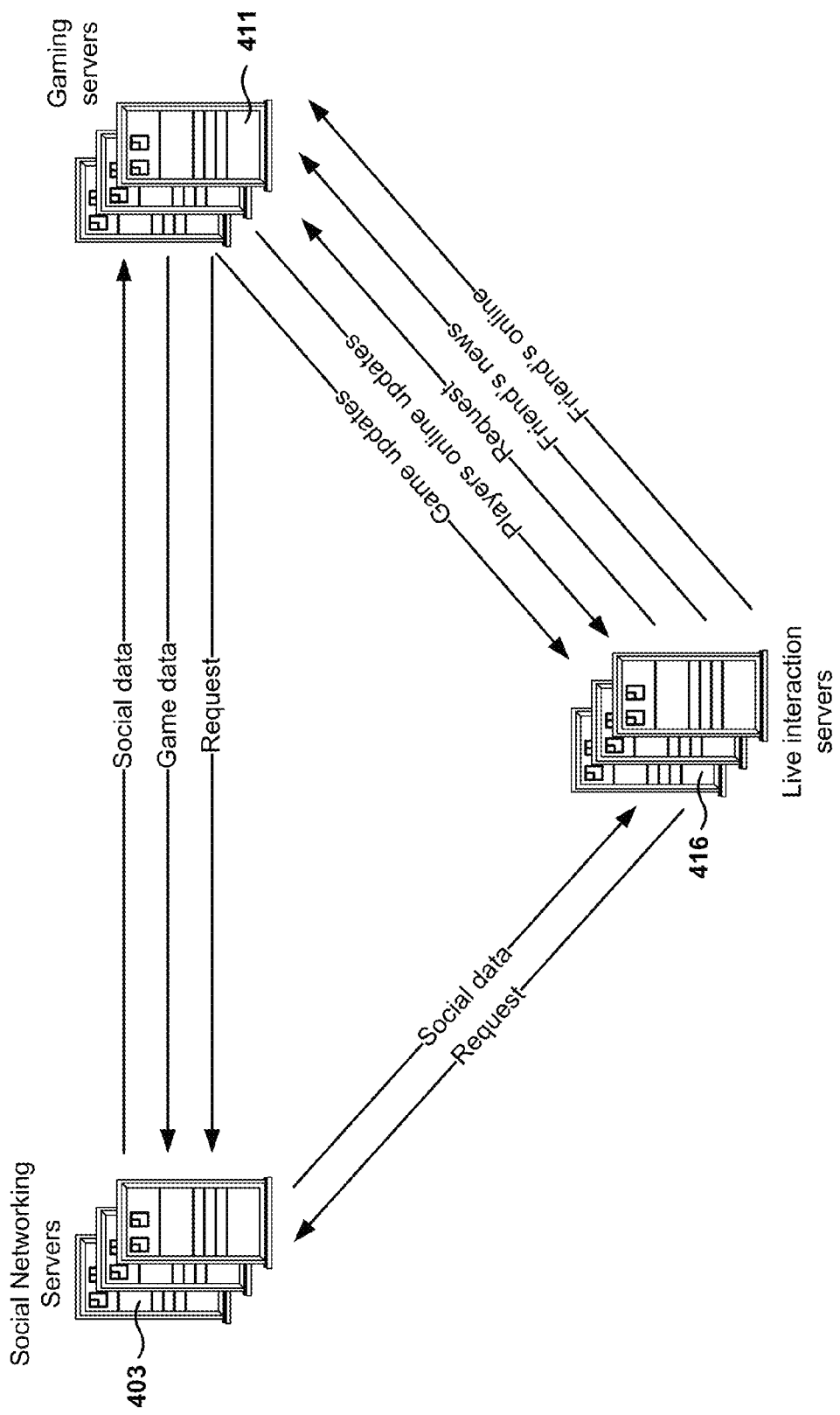
FIG. 4B illustrates the interactions between the servers of FIG. 4A, in accordance with one embodiment of the invention.

FIG. 4B illustrates the interactions between the servers of FIG. 4A, in accordance with one embodiment of the invention. As described above, social networking servers 403 collect social data regarding the players. This social data is made available to gaming servers 411 and live interaction servers 416. The social data might be sent periodically, without a request for data, or may be sent as the result of a request sent from the gaming servers 411 or the live interaction servers 416.

The gaming servers 411 are used to execute the online games and hold the gaming data, which can be shared with social networking servers 403 and live interaction servers 416. The game data (e.g., game updates) may be sent periodically, without responding to a request, or might be sent in response to a request, or might be sent in combination ("piggy-backed") with other information exchanged between the servers (e.g., game progress or activities data). In one embodiment, live interaction servers 416 periodically poll gaming servers 411 requesting the list of users that are online playing the game, or the list of neighbors of a particular user that are currently online. In one embodiment, polling is performed every 15 seconds, and in another embodiment, the polling interval is in the range between 5 seconds and 5 minutes, although other values are also possible.

In one embodiment, communications between users are managed by the live interaction servers 416. A first user knows that a second user is online because the live interaction servers 416 have notified the first user that the second user is online playing the game (of course the first user and the second users are friends in the online game). When the first user sends a message to the second user, the game of the first user sends the message to the live interaction servers 416, which forward the message to the game of the second user. Similarly, when the second user wants to send a message to the first user, the message is sent through live interaction servers 416.

In another embodiment, the game update information sent by the gaming servers 411 includes information regarding the users playing a particular game, as well as information regarding users that are playing other online games. This way, a player may receive information about the neighbors that are playing the same online game, or about the neighbors that are playing other online games. The game updates sent from the gaming servers 411 include information regarding the status of the neighbor's game. The status may include score, current activities, requests for help, recent progress made in the game, sign-on and sign-off information, etc.

Live interaction servers 416 keep track of which neighbors are online at a given time. Live interaction servers 416 analyze the game updates received from gaming servers 411 and create social game data to inform users of neighbor's activities. These activities may include information on which neighbors are online, neighbor's recent activities (e.g., game progress), news, etc.

It is noted that the embodiments illustrated in FIG. 4B are exemplary. Other embodiments may utilize different server configurations, divide the tasks differently among the servers, or exchange information between servers in different forms. The embodiments illustrated in FIG. 4B should therefore not be interpreted to be exclusive or limiting, but rather exemplary or illustrative.

Figure 5:
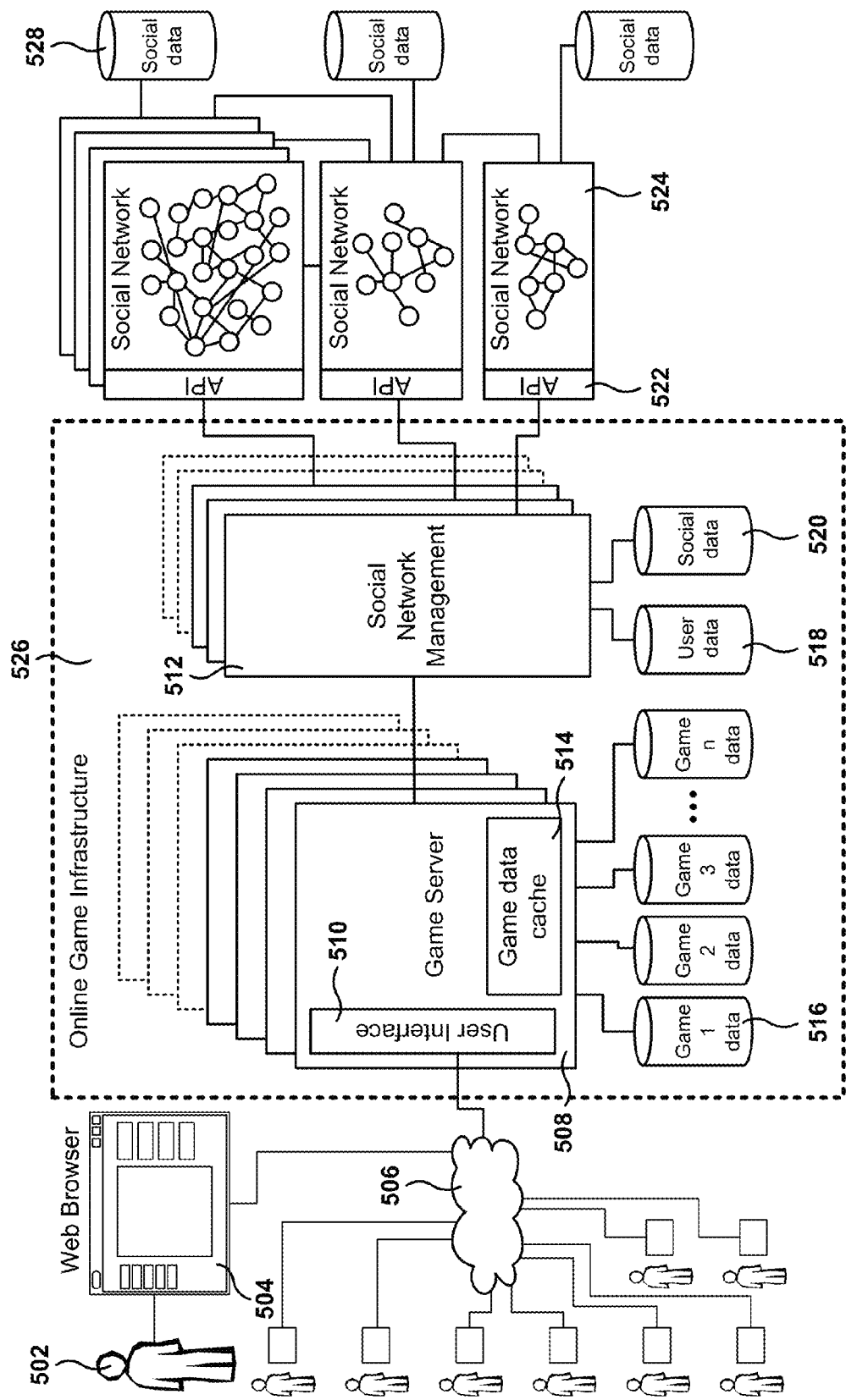
FIG. 5 illustrates an implementation of a Massively Multiplayer Online (MMO) infrastructure, according to one embodiment.

FIG. 5 illustrates an implementation of an online game infrastructure, according to one embodiment. The online game infrastructure 526 includes one or more game servers 508, web servers (not shown), one or more social network management servers 512, and databases to store game related information. In one embodiment, game server 508 provides a user interface 510 for players 502 to play the online game. In one embodiment, game server 508 includes a Web server for players 502 to access the game via web browser 504, but the Web server may also be hosted in a server different from game server 508. Network 506 interconnects players 502 with the one or more game servers 508.

Each game server 508 has access to one or more game databases 516 for keeping game data. In addition, a single database can store game data for one or more online games. Each game server 508 may also includes one or more levels of caching. Game data cache 514 is a game data cache for the game data stored in game databases 516. For increased performance, caching may be performed in several levels of caching. For instance, data more frequently used is stored in a high priority cache, while data requiring less access during a session will be cached and updated less frequently.

The number of game servers 508 changes over time, as the gaming platform is an extensible platform that changes the number of game servers according to the load on the gaming infrastructure. As a result, the number of game servers will be higher during peak playing times, and the number of game servers will be lower during off-peak hours. In one embodiment, the increase or decrease of bandwidth is executed automatically, based on current line usage or based on historical data.

One or more social network management servers 512 provide support for the social features incorporated into the online games. The social network management servers 512 access social data 528 from one or more social networks 524 via Application Programming Interfaces (API) 522 made available by the social network providers. Each social network 524 includes social data 528, and this social data 528, or a fraction of the social data, is made available via API 522. As in the case of the game servers, the number of social network management servers 512 that are active at a point in time changes according to the load on the infrastructure. As the demand for social data increases, the number of social network management servers 512 increases. Social network management servers 512 cache user data in database 518, and social data in database 520. The social data might include the social networks where a player is present, the social relationships for the player, the frequency of interaction of the player with the social network and with other players, etc. Additionally, the user data kept in database 518 may include the player's name, demographics, e-mail, games played, frequency of access to the game infrastructure, etc.

It is noted that the embodiment illustrated in FIG. 5 is an exemplary online gaming infrastructure. Other embodiments may utilize different types of servers, databases, APIs, etc., and the functionality of several servers can be provided by a single server, or the functionality can be spread across a plurality of distributed servers. The embodiment illustrated in FIG. 5 should therefore not be interpreted to be exclusive or limiting, but rather exemplary or illustrative.

Figure 6:
FIG. 6 shows the game stage when a friend is detected online, according to one embodiment.

FIG. 6 shows the game stage when a friend is detected online, according to one embodiment. In one embodiment, the online game has two different modes of play: an asynchronous mode and a synchronous mode. In the asynchronous mode, a player may interact with the game board of the neighbor while the neighbor is offline, or while the neighbor is online but the player is not aware that the neighbor is online. For example, a player may visit the neighbor's game board and perform operations therein, without the neighbor being aware real-time of the visit. The neighbor, whose game board is visited, will be notified at a later time of the visit, including the progress made in the neighbor's game during the visit. In one embodiment, the neighbor may also be notified via a different method not involving the online game, such as sending an e-mail, posting a message on a social network site, sending a phone text message, etc.

During synchronous play, a player of the game is aware that that neighbor is currently online playing the game. As a result, the interactions between the player and the neighbor can be made in real-time, or almost real-time. In one embodiment, a status indicator 602 that the player is "online" is shown next to the icon associated with the player. In another embodiment, a news field 604 (also referred to as the news stream or news updates) is added to the game stage of the player, where live news, regarding the game progress of one or more neighbors, are displayed. For example, the news stream may show that the friend has finished building a Post Office in her city (i.e., game board). In one embodiment, some of the features of the game available in synchronous mode are not available while on asynchronous mode, and vice versa.

While the player is online, the game provider automatically changes the mode of play between synchronous and asynchronous mode, depending on whether the neighbor is online or offline simultaneously with the player. The player doesn't have to choose between playing synchronously or asynchronously. When friends are online simultaneously with the player, some activities are performed synchronously, and if friends are offline, then the game is played using asynchronous activities.

Players are incentivized to play together when the players are simultaneously online. Furthermore, players can take part in group activities when they are online, and the players get the feeling that they are doing something together. For example, a first layer may have the role of a cop and a second player of a robber. A car chase can take place between the first and second players using real-time interactions. In one embodiment, players receive rewards for engaging in synchronous social activities.

Figure 7:
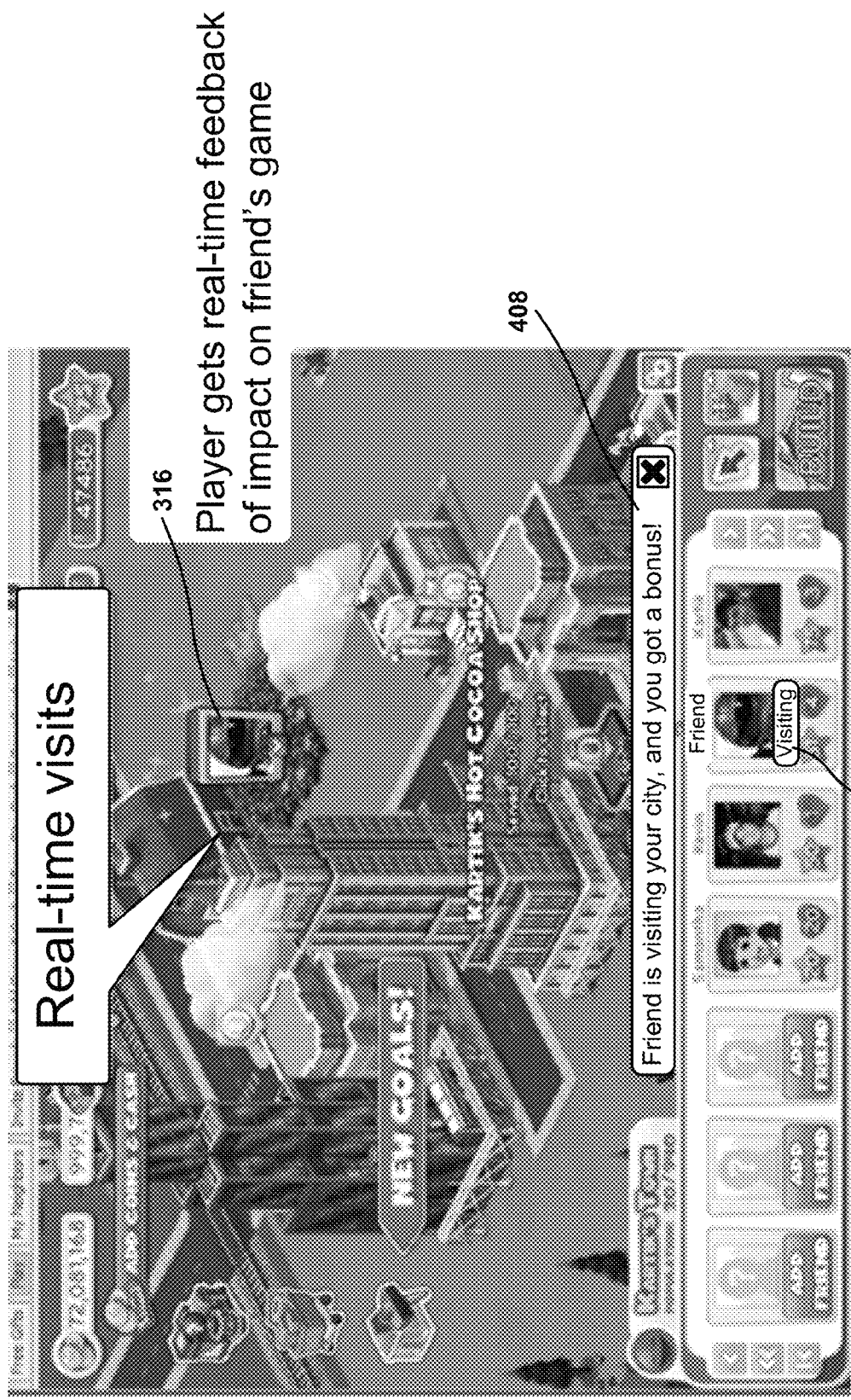
FIG. 7 illustrates a real-time visit to a friends game board, according to one embodiment.

FIG. 7 illustrates a real-time visit to a friend's game board, according to one embodiment. FIG. 7 shows the game board of a player that has a friend 316 playing simultaneously, i.e., both player and friend are online playing the game. The status indicator 316 for the player that is currently online shows that "Friend" is "visiting" the game board of the player. In addition, in one embodiment, news field 408 also indicates that the friend is visiting (e.g., displaying the message "Friend is visiting your city, and you got a bonus!").

In one embodiment, the player gets real-time indications on what the friend is doing while visiting the game board (e.g., the player's city). In another embodiment, an icon 316 associated with the visiting friend is moved around the city as the friend enters commands to move his avatar or mouse around the city. This way, the player knows what the friend is doing. In addition, if the friend performs an action in the game board (e.g., harvests a crop by clicking on the crop), the player sees immediately the consequences of the friend's action (e.g., the crop is harvested and the field where the crop was harvested now shows dirt, which indicates that a new crop can be planted on this field).

Figure 8:
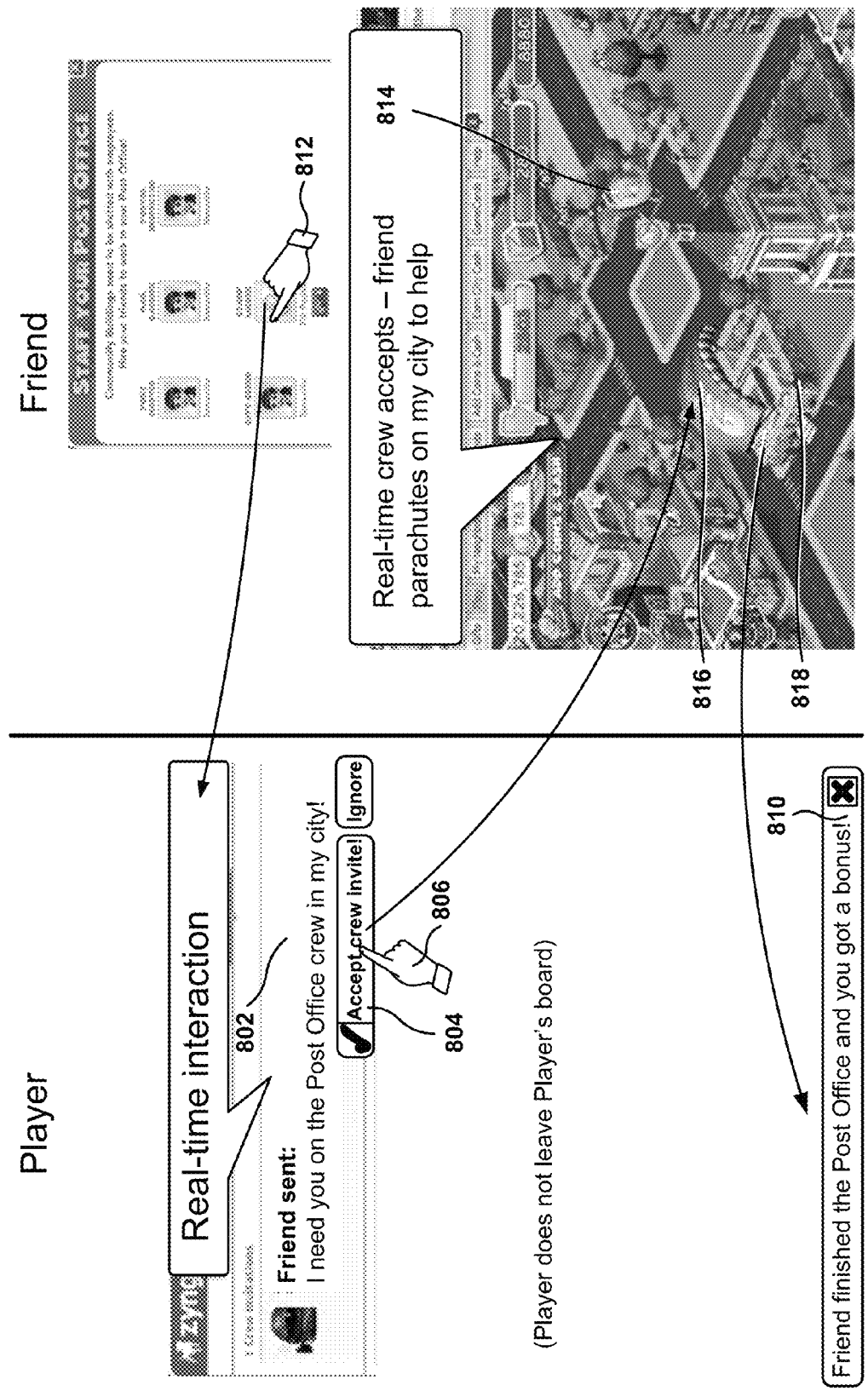
FIG. 8 illustrates a low-friction interaction between a player and her friend, according to one embodiment.

FIG. 8 illustrates a low-friction interaction between a player and her friend, according to one embodiment. In one embodiment, a friend is performing an activity in her own game board, and the friend needs help from neighbors to complete this activity. For example, the friend needs the neighbor to complete staffing the Post Office. The friend clicks 812 in an option of the game to request help from the player to complete this operation. Since the friend knows that the player is currently online, the friend hopes that the viral request for help is completed quickly.

The request is presented to the player, which is a neighbor of friend, to notify the player that the friend wants help. In one embodiment, a message indicator notifies the user of the incoming message with the request. It is noted that the player does not need to reload the game to see the message indicator. When the player reads the message with the request, text 802 in the message describes the nature of the request. The player is presented with buttons to accept 804 or ignore the request.

If the player clicks 806 accept button 804, the game provides the help to the friend. However, the helping player does not need to leave her own game board to help, which means that the helping player does not have to leave her board, load the friend's board, perform an action to help, and then re-load her own board to get back to her game. Once the player clicks the accept button, the player does not need to perform other actions to complete the help operation. This constitutes a low-friction interaction for the player, because the help is given with little effort without having to leave the game board. The low-friction interaction encourages social help because of the small effort required to provide help. Besides, the helper also is offered a reward, such as a gift, or additional currency. In addition, the player gets instant gratification for knowing that the player has helped the friend.

Once the game recognizes the help given by the player, the game proceeds to complete the help operation in the friends game board. In one embodiment, an action, such as an animation, is performed in the friend's game board to show the completion of the help operation. For example, a helicopter 814 flies by the city of the friend, and an avatar 818 parachutes 816 from the helicopter to the Post Office 818. The avatar performs and animation in the Post Office to complete the help operation. In addition, the consequences of the help will also be shown in the game board. For example, if the help provided completes the Post Office, the building for the Post Office will change from a building under construction to a finished building. In another example, if the help unwithers a crop (i.e., it makes a withered crop come back to be a healthy crop), then the crop will be shown as healthy in the game board. In one embodiment, the helper gets notification in the news field 810 that the help was completed, and the helper gets a reward for helping.

In one embodiment, the request for help may be sent to a group of neighbors, each neighbor being either online or offline. This way, the help requester has more chances to get the needed help faster. The help may come from a player which is online, and that performs a low-friction operation for help, or the help may be given by a player that is currently offline, but that subsequently signs in and completes the viral request for help. In another embodiment, the player is given an option to send the request only to neighbors that are currently online. In yet another embodiment, the player is given an option to send the request only to the neighbors that are currently offline.

In one embodiment, the action further occurs without input by the first user to control the action in the second game board. Still further, the action can be in the form of an animation of an avatar of the first user, which appears to the second user as if the first user was actually providing active participation and was actually controlling his or her avatar on the game board of the second user, but without requiring active participation by the first user. Instead, the action is automatically executed by the online game, without direction from the first user, to simulate that the first user is performing the action. In one embodiment, the action takes one form from a plurality of forms, based on game context or the action to be performed, or both. Each form from the plurality of forms defines a sequence of moves or interactivity by an avatar or by objects in the game board, or by a combination thereof. For example, if the action is building a post office, the avatar may wear construction-worker type clothes and carry one or more tools, such as a shovel. The animation for building the post office may include a sequence of images with different progress on the construction of the post office, from building the foundation to installing the roof.

In one embodiment, the animation is related to one or more of buildings, automobiles, helicopters, planes, trains, motorcycles, bicycles, groups of avatars, etc., or combinations thereof. In one embodiment, each of the forms from the plurality of forms is selected dynamically by the online game. The form may be selected from a lookup table, but other types of animation-selection logic are also possible. The lookup table is accessed to select the corresponding animation, based on the current context of the game and the activity being performed.

Figure 9:
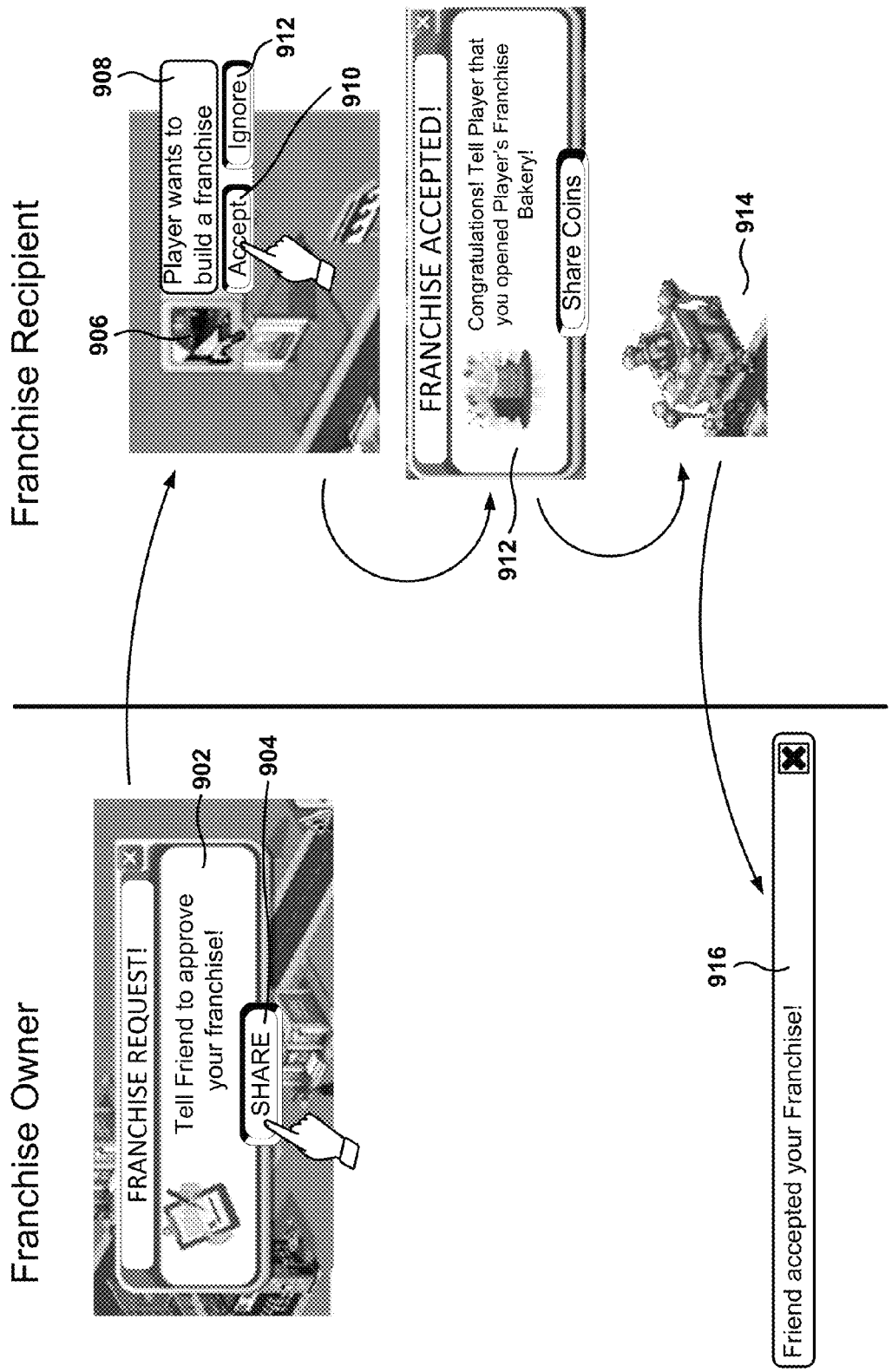
FIG. 9 illustrates a low-friction interaction between two players regarding the acceptance of a franchise request, according to one embodiment.

FIG. 9 illustrates a low-friction interaction between two players regarding the acceptance of a franchise request, according to one embodiment. A franchise is a building installed by a franchise owner (i.e., a player) in the game board (e.g., city) of a neighbor, where the franchise generates rewards (e.g., income) for the franchise owner. The franchise may also generate rewards for the owner of the game board where the franchise is installed.

In one embodiment, a player (referred to herein as the franchise owner) wishing to install a franchise in the city of a neighbor (referred to as the franchise recipient) visits the city where the franchise is to be installed. The franchise owner looks for an empty lot in the franchise recipient's city, and then clicks on the selected lot to choose the type of franchise to install. After the lot is selected, the game displays message 902 (e.g., "tell friend to approve your franchise!") To prompt the franchise owner to inform the franchise recipient. In another embodiment, the franchise owner may post a message for the franchise recipient.

After the franchise owner clicks on button 904 to send the request to the franchise recipient, the notification for the request is sent to the game of the franchise recipient. While in synchronous mode, the franchise requester knows that the franchise recipient is online, therefore, sending the franchise request will likely result in a faster completion of the franchise installation. In one embodiment, the franchise recipient sees an icon 906 of the franchise owner on the empty lot where the franchise is to be installed. Next to the icon 906, a message 908 with the franchise request is displayed. In addition, button 910 for accepting the franchise and bottom 912 for rejecting the request are presented to the user with message 908.

If the franchise recipient clicks on button 910 to accept the franchise request, then message 912 is presented on the display indicating that the franchise has been installed. In addition, the empty lot will now show the installed franchise 914. If the franchise owner is online, message 916 will show in the news field indicating that the friend accepted the franchise.

In one embodiment, if the franchise requester is visiting the game board of the franchise recipient while the request for franchise is being presented, the franchise requester will see a live animation showing how the franchise is being installed. The franchise requester will see the change from an empty lot to an installed franchise building. Once the franchise is installed, the franchise owner can supply goods for the franchise (e.g., ice cream for an ice cream parlor) from her own game board, without having to visit the franchise recipient's game board.

Figure 10:
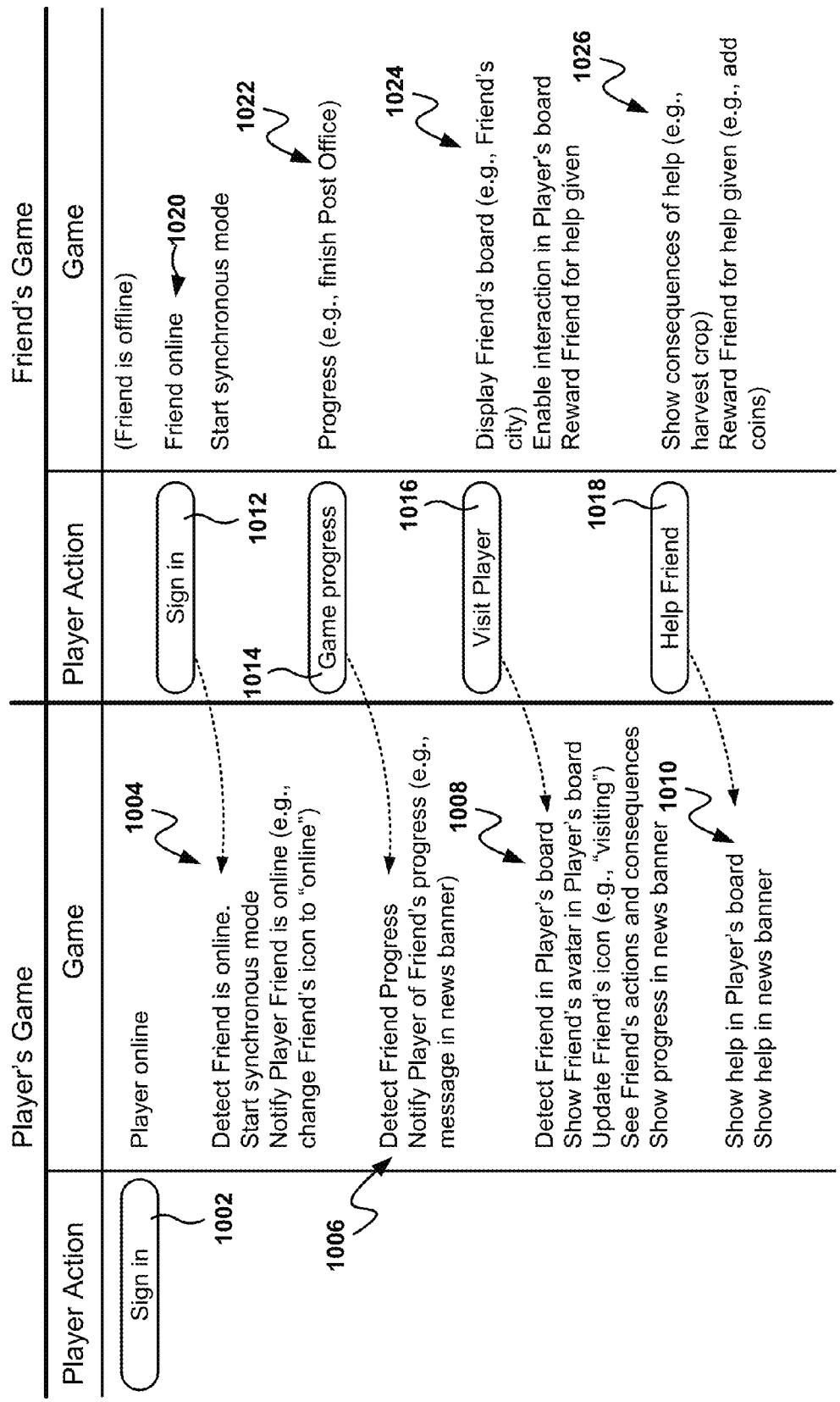
FIG. 10 illustrates the interaction between the games of two players when a friend is detected online, in accordance with one embodiment of the invention.

FIG. 10 illustrates the interaction between the games of two players when a friend is detected online, in accordance with one embodiment of the invention. With regard to FIGS. 10-12, the activities of two players are described, as well as the interaction between the games of the two players. For description purposes, one of the players is called the "player" and the other player is called the "friend." Of course, the "friend" and the "player" are neighbors in the online game, and any of the activities performed by one of them can be performed by the other one when the game interaction develops in the opposite direction (e.g., player can visit friend, and friend can visit player).

In the embodiment of FIG. 10, the friend is initially offline. When the player signs in 1002, the status of the player changes to online. The friend also signs in 1012 and the status of the friend changes to online 1020. Since both players are now online, the synchronous mode of play begins as soon as the game correlates that both players are simultaneously online. When the player's game detects that the friend is online 1004, the player's game starts synchronous mode. The game notifies the player that the friend is now online. In one embodiment, an icon associated with the friend changes the contents of a status field to be "online"

As the friend's game progresses 1014 (e.g., the friend finishes a Post Office 1022), the progress is detected 1006 in the player's game, and this progress is shown to the player, such as in the news banner of FIG. 6. When the friend visits the player 1016, the friend's game displays the player's game board (e.g., the city) of player. The friend is able to interact with the player's game board (see for example the interactions presented in FIG. 3). As the friend helps the player, the friend receives rewards for her help.

As the friend is visiting the player's board, the player's game detects 1008 the presence of friend in the player's board. An icon or animation associated with the friend is presented in the player's game. In one embodiment, the icon is a picture from the profile's friend in the online game, and in another embodiment, the icon is and avatar generated by the online game, but other types of icons are also possible. In addition, the status indicator associated with the status of friend in the player's game changes from "online" to "visiting." The player is able to see in real time the actions performed by the friend in the player's board (e.g., collecting rent by clicking on a building). In addition, the progress made by a friend may also be shown in the news banner.

When the friend performs an action in the player's board to help player 1018, the friend sees the consequences of providing help on the game stage 1026 (e.g., if the friend clicks on a crop that is ready to be harvested, the crop is harvested and the field changes the dirt showing that the field is ready for planting a new crop). In addition, the friend receives rewards (e.g., currency) for giving a helping hand. On the player's side, as the friend gives a helping hand, the actions of friend are shown on the player's board 1010. In one embodiment, the news field is updated with information regarding the help provided by friend.

Figure 11:
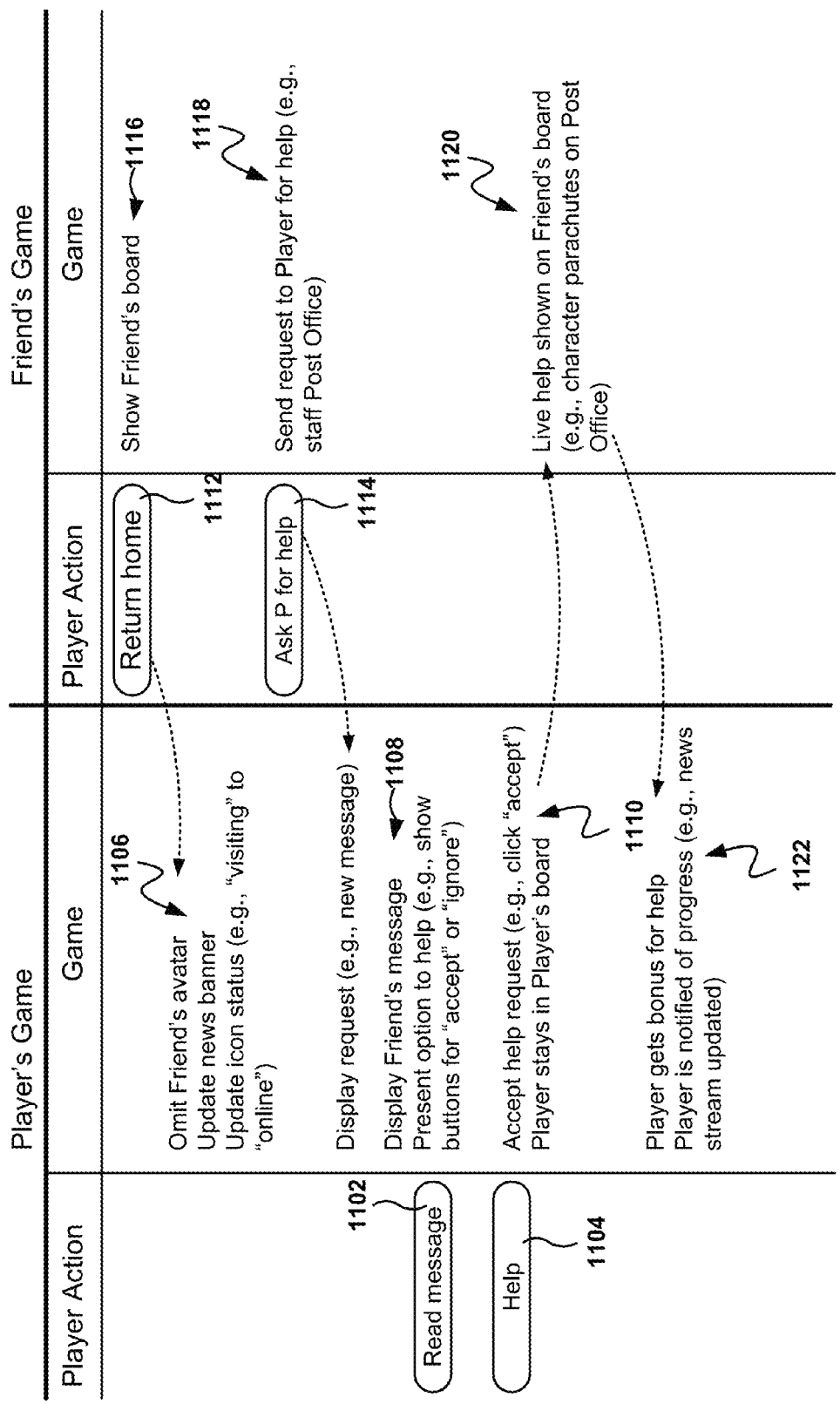
FIG. 11 illustrates the interactions between two games during a low-friction interaction operation, according to one embodiment.

FIG. 11 illustrates the interactions between two games during a low-friction interaction operation, according to one embodiment. When the friend returns home 1112 from visiting the player's game board, the friend's own game board is loaded by the game 1116. On the player's side, once the friend terminates the visit, the friend's avatar is withdrawn 1106 from the game board of the player. In addition, the news banner may also be updated indicating that the friend has left the player's board, and the status indicator associated with the friend in the player's game changes back from "visiting" to "online" (or to "offline" if the friend signs off without returning to her board).

In operation 1114, the friend sends a request to the player for help. For example, the friend wishes to staff her Post Office with player 1118. On the player's game, the request for help is shown to player, and since player is online the player has immediate access to the request. A message from friend is displayed 1108, and an option (e.g., a button) to accept the request for help is presented to the player. In one embodiment, the player is given an option to accept, and an option to ignore or reject the request.

After the player reads the message with the request 1102, the player accepts or rejects the request. If the player decides to help 1104, by for example clicking on the "accept" button 1110, the action to provide help to the friend is started. It is noted that the player is able to provide help while playing in the player's board, without having to visit the friend's game board.

When in synchronous mode, the help provided by player is visualized in the friend's game 1120. For example, a character associated with the player parachutes from a helicopter into the Post Office, as previously described with reference to FIG. 8. In one embodiment, a player gets a bonus or reward for helping 1122. Therefore, the player has an incentive to help, especially given the small effort required to provide the help, i.e., the low-friction interaction. In one embodiment, the news stream is updated in the player's game board and/or the friend's game board.

Figure 12:
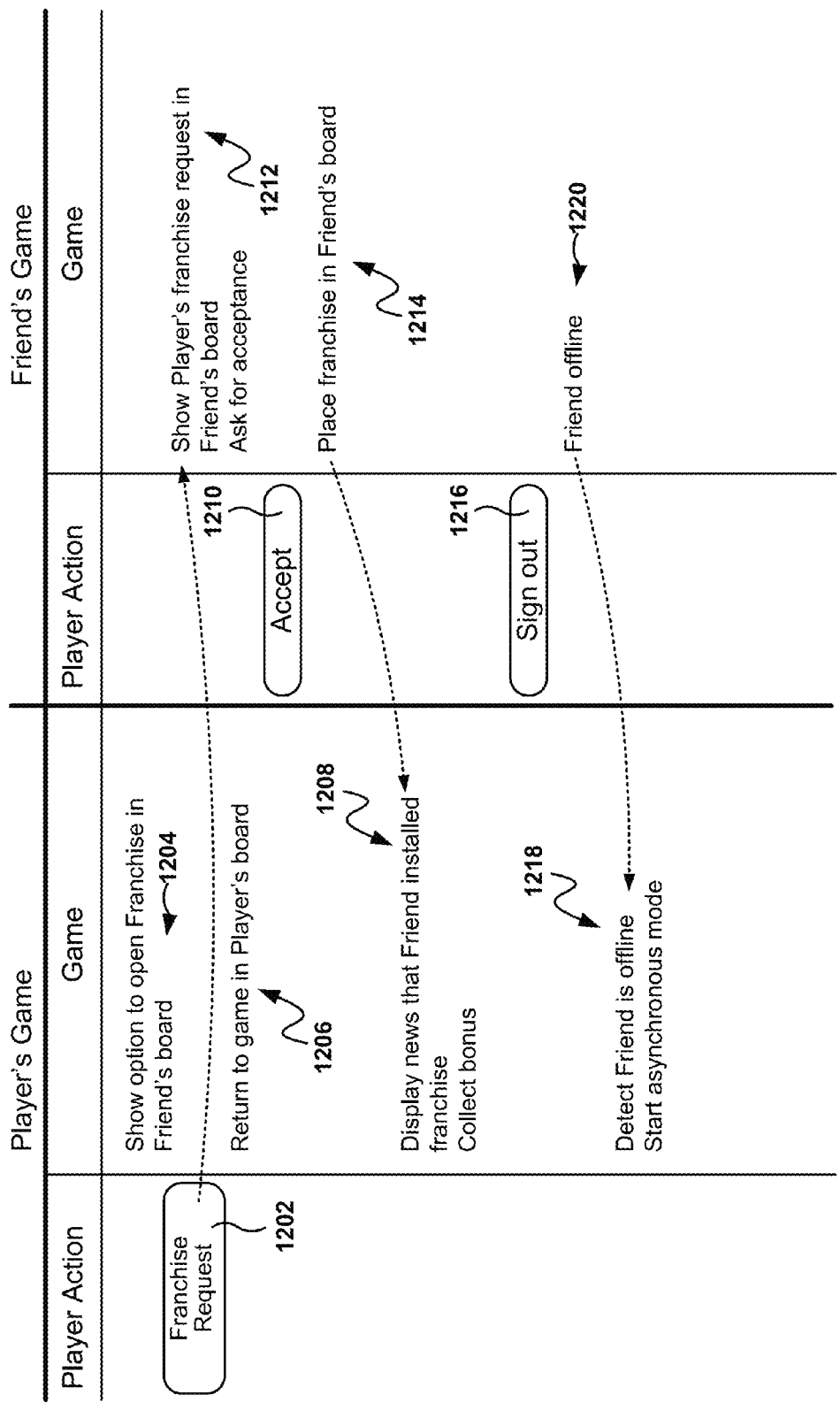
FIG. 12 illustrates the interactions between two games during a real-time acceptance of a friend's request, according to one embodiment.

FIG. 12 illustrates the interactions between two games during a real-time acceptance of a friend's request, according to one embodiment. One of the options 1204 in the online game is the installation of a franchise in another player's board (e.g., city). In operation 1202, the player requests a franchise 1202 to be installed in the friend's city. In one embodiment, the request includes visiting the friend's city and selecting a lot for the franchise, as previously described with reference to FIG. 9. After selecting the lot and sending the franchise request, the player returns to the online game 1206 and the player's board.

When the friend's game detects 1212 the franchise request, the request is presented on the display. In one embodiment, the request is presented on top of the empty lot where the franchise would be installed. If the friend accepts 1210 the franchise installation, the franchise is placed in the friend's board where the empty lot previously existed 1214. After the friend's acceptance, the player's game board displays the news that the friend has installed the franchise 1208. In one embodiment, the player also collects a bonus or reward for having installed the franchise.

In operation 1216, the friend signs out and the status changes to offline 1220. When that player's game detects that the friend is now offline 1218, the online game returns to an asynchronous mode of play.

Figure 13:
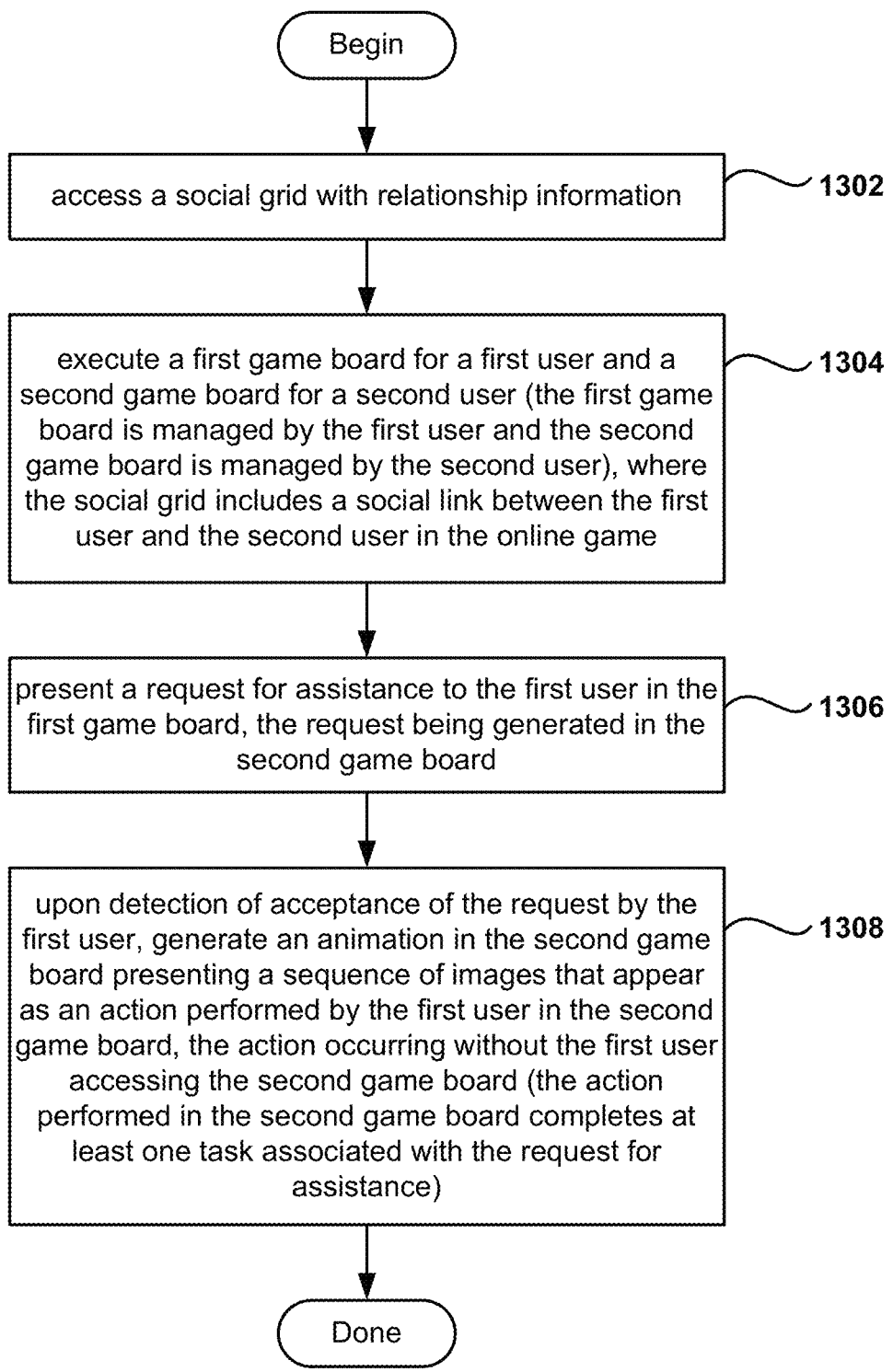
FIG. 13 shows a flowchart illustrating an algorithm for processing game operations during execution of an online game, in accordance with one embodiment of the invention.

FIG. 13 shows a flowchart illustrating an algorithm for processing game operations during execution of an online game, in accordance with one embodiment of the invention. In operation 1302, a social grid is accessed, the social grid having relationship information. From operation 1302, the method continues to operation 1304, where a first game board for a first user and a second game board for a second user are executed. The first game board is managed by the first user and the second game board is managed by the second user, and the social grid includes a social link between the first user and the second user in the online game, i.e., the first user and the second user are neighbors in the online game.

The method continues the operation 1306, where a request is presented, the request being for assistance to the first user in the first game board, and being generated in the second game board. Further, in operation 1308, upon detection of acceptance of the request by the first user, an animation is generated in the second game board. The animation presents a sequence of images that appear as an action performed by the first user in the second game board. Additionally, the action occurs without the first user accessing the second game board, and the action performed in the second game board completes at least one task associated with the request for assistance.

In one embodiment, the action occurs without input by the first user to control the action in the second game board. The action may be in the form of an animation of an avatar of the first user, which appears to the second user as if the first user was actually providing active participation and was actually controlling his or her avatar on the game board of the second user, but without requiring the active participation of the first user. In one embodiment, the animation may include a plurality of avatars. For example, the avatar associated with the first player visits the game board of the second player accompanied by a crew of workers, which then help to complete the activity, such as for example, building a road. Further, the action is automatically executed by the online game, without direction from the first user, to simulate that the first user is performing the action. Of course, the user may start the action by providing an input that authorizes the help to the second user, but after the authorization is given, the involvement of the first user ends, and the game takes over from there to complete the animation.

In one embodiment, the action takes a form from a plurality of forms, based on game context or the action to be performed. Each form from the plurality of forms defines a sequence of moves or interactivity by an avatar or by objects in the game board, or by a combination thereof. For example, if the action is building a post office, the avatar may wear construction-worker type clothes and carry one or more tools, such as a shovel. The animation for building the post office may include a sequence of images with different progress on the construction of the post office, from building the foundation to putting the roof. In one embodiment, each of the forms from the plurality of forms is selected dynamically by the online game. The form may be selected from a lookup table, but other types of animation-selection logic are also possible. The lookup table is accessed to select the corresponding animation, based on the current context of the game and the activity being performed.

Figure 14:
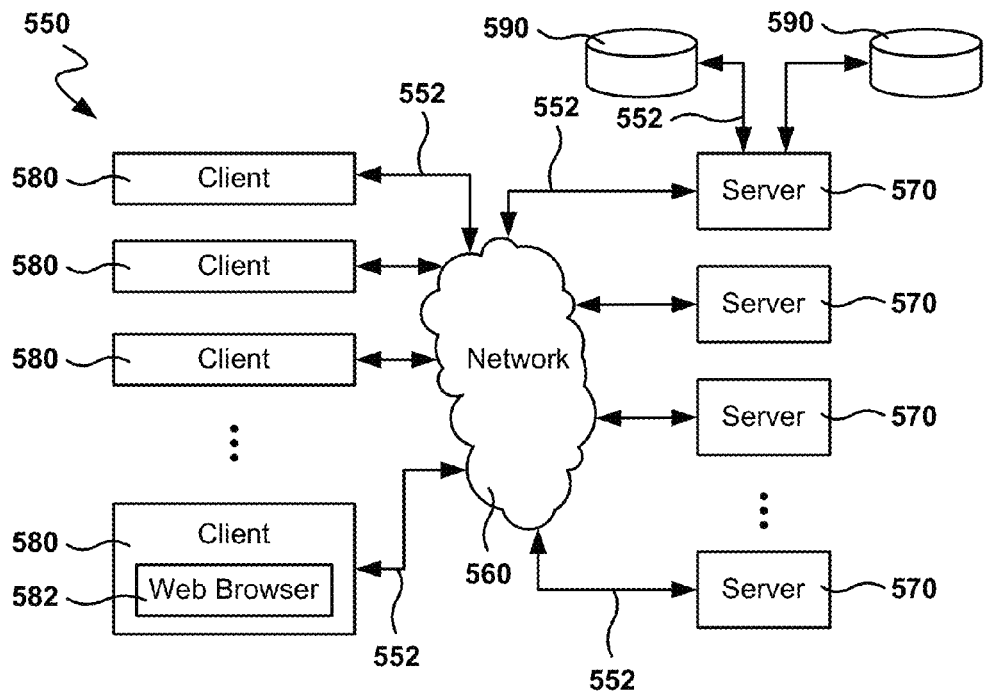
FIG. 14 illustrates an example network environment suitable for implementing embodiments of the invention.

FIG. 14 illustrates an example network environment 550 suitable for implementing embodiments of the invention. Network environment 550 includes a network 560 coupling one or more servers 570 and one or more clients 580 to each other. In particular embodiments, network 560 is an intranet, an extranet, a virtual private network (VPN), a local area network (LAN), a wireless LAN (WLAN), a wide area network (WAN), a metropolitan area network (MAN), a portion of the Internet, another network, or a combination of two or more such networks 560.

One or more links 552 couple a server 570 or a client 580 to network 560. In particular embodiments, one or more links 552 each includes one or more wireline, wireless, or optical links 552. In particular embodiments, one or more links 552 each includes an intranet, an extranet, a VPN, a LAN, a WLAN, a WAN, a MAN, a portion of the Internet, or another link 552 or a combination of two or more such links 552.

Each server 570 may be a stand-alone server or may be a distributed server spanning multiple computers or multiple datacenters. Servers 570 may be of various types, such as, for example and without limitation, web server, news server, mail server, message server, advertising server, file server, application server, exchange server, database server, or proxy server. Each server 570 may include hardware, software, embedded logic components, or a combination of two or more such components for carrying out the appropriate functionalities implemented or supported by server 570. For example, a web server is generally capable of hosting websites containing web pages or particular elements of web pages. More specifically, a web server may host HTML files or other file types, or may dynamically create or constitute files upon a request, and communicate them to clients 580 in response to HTTP or other requests from clients 580. A mail server is generally capable of providing electronic mail services to various clients 580. A database server is generally capable of providing an interface for managing data stored in one or more data stores.

In particular embodiments, one or more data storages 590 may be communicatively linked to one or more severs 570 via one or more links 552. Data storages 590 may be used to store various types of information. The information stored in data storages 590 may be organized according to specific data structures. In particular embodiments, each data storage 590 may be a relational database. Particular embodiments may provide interfaces that enable servers 570 or clients 580 to manage, e.g., retrieve, modify, add, or delete, the information stored in data storage 590.

In particular embodiments, each client 580 may be an electronic device including hardware, software, or embedded logic components or a combination of two or more such components and capable of carrying out the appropriate functionalities implemented or supported by client 580. For example and without limitation, a client 580 may be a desktop computer system, a notebook computer system, a netbook computer system, a handheld electronic device, or a mobile telephone. A client 580 may enable a network player at client 580 to access network 580. A client 580 may enable its player to communicate with other players at other clients 580. Further, each client 580 may be a computing device, such as a desktop computer or a work station, or a mobile device, such as a notebook computer, a network computer, or a smart telephone.

In particular embodiments, a client 580 may have a web browser 582, such as MICROSOFT INTERNET EXPLORER, GOGGLE CHROME, or MOZILLA FIREFOX, and may have one or more add-ons, plug-ins, or other extensions. A player at client 580 may enter a Uniform Resource Locator (URL) or other address directing the web browser 582 to a server 570, and the web browser 582 may generate a Hyper Text Transfer Protocol (HTTP) request and communicate the HTTP request to server 570. Server 570 may accept the HTTP request and communicate to client 580 one or more Hyper Text Markup Language (HTML) files responsive to the HTTP request. Client 580 may render a web page based on the HTML files from server 570 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Web browser 582 may be adapted for the type of client 580 where the web browser executes. For example, a web browser residing on a desktop computer may differ (e.g., in functionalities) from a web browser residing on a mobile device. A user of a social networking system may access the website via web browser 582.

Figure 15:
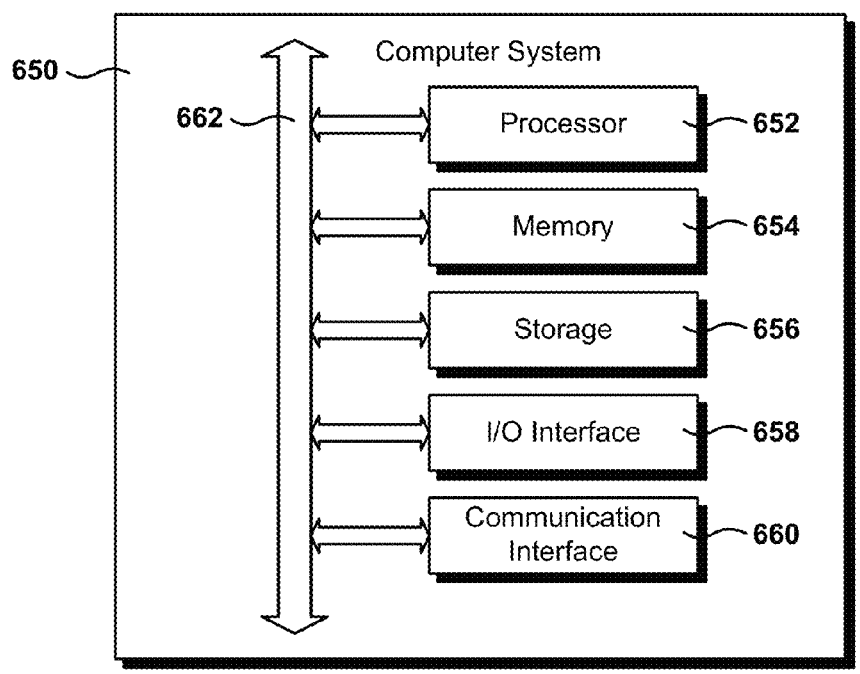
FIG. 15 illustrates an example computer system for implementing embodiments of the invention.

FIG. 15 illustrates an example computer system 650 for implementing embodiments of the invention. In particular embodiments, software running on one or more computer systems 650 performs one or more operations of one or more methods described or illustrated herein or provides functionality described or illustrated herein. Although methods for implementing embodiments were described with a particular sequence of operations, it is noted that the method operations may be performed in different order, or the timing for the execution of operations may be adjusted, or the operations may be performed in a distributed system by several entities, as long as the processing of the operations are performed in the desired way.

As example and not by way of limitation, computer system 650 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 650 may include one or more computer systems 650; be stand-alone or distributed; span multiple locations; span multiple machines; or reside in a cloud, which may include one or more cloud components in one or more networks. The one or more computer systems 650 may perform in real time or in batch mode one or more operations of one or more methods described or illustrated herein.

In particular embodiments, computer system 650 includes a processor 652, memory 654, storage 656, an input/output (I/O) interface 658, a communication interface 660, and a bus 662. Although this disclosure describes and illustrates a particular computer system having a particular number of particular components in a particular arrangement, embodiments of the invention may be implemented with any suitable computer system having any suitable number of any suitable components in any suitable arrangement.

In particular embodiments, processor 652 includes hardware for executing instructions, such as those making up a computer program. As an example and not by way of limitation, to execute instructions, processor 652 may retrieve (or fetch) the instructions from an internal register, an internal cache, memory 654, or storage 656; decode and execute them; and then write one or more results to an internal register, an internal cache, memory 654, or storage 656. The present disclosure contemplates processor 652 including any suitable number of any suitable internal registers, where appropriate. Where appropriate, processor 652 may include one or more arithmetic logic units (ALUs); be a multi-core processor; or include one or more processors 652. Although this disclosure describes and illustrates a particular processor, this disclosure contemplates any suitable processor.

In particular embodiments, memory 654 includes main memory for storing instructions for processor 652 to execute, or data that can be manipulated by processor 652. As an example and not by way of limitation, computer system 650 may load instructions from storage 656 or another source (such as, for example, another computer system 650) to memory 654. Processor 652 may then load the instructions from memory 654 to an internal register or internal cache. During or after execution of the instructions, processor 652 may write one or more results (which may be intermediate or final results) to the internal register or internal cache. Processor 652 may then write one or more of those results to memory 654. One or more memory buses (which may each include an address bus and a data bus) may couple processor 652 to memory 654. Bus 662 may include one or more memory buses, as described below. One or more memory management units (MMUs) reside between processor 652 and memory 654 and facilitate accesses to memory 654 requested by processor 652. Memory 654 includes random access memory (RAM).

As an example and not by way of limitation, storage 656 may include an HDD, a floppy disk drive, flash memory, an optical disc, a magneto-optical disc, magnetic tape, or a Universal Serial Bus (USB) drive or a combination of two or more of these. Storage 656 may include removable or non-removable (or fixed) media, where appropriate. In particular embodiments, storage 656 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these.

In particular embodiments, I/O interface 658 includes hardware, software, or both providing one or more interfaces for communication between computer system 650 and one or more I/O devices. One or more of these I/O devices may enable communication between a person and computer system 650. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these.

Communication interface 660 includes hardware, software, or both providing one or more interfaces for communication between computer system 650 and one or more other computer systems 650 on one or more networks. As an example and not by way of limitation, communication interface 660 may include a network interface controller (NIC) or network adapter for communicating with an Ethernet or other wire-based network or a wireless NIC (WNIC) or wireless adapter for communicating with a wireless network, such as a WI-FI network. As an example, computer system 650 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these.

In particular embodiments, bus 662 includes hardware, software, or both coupling components of computer system 650 to each other. As an example and not by way of limitation, bus 662 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 662 may include one or more buses 662, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure that may store a computer program or data. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a Secure Digital card, a Secure Digital drive, or another suitable computer-readable storage medium or a combination of two or more of these, where appropriate. Herein, reference to a computer-readable storage medium excludes any medium that is not eligible for patent protection under 35 U.S.C. §101.

One or more embodiments of the present invention can also be fabricated as computer readable code on a non-transitory computer readable medium. Herein, reference to software may encompass one or more applications, bytecode, one or more computer programs, one or more executables, one or more instructions, logic, machine code, one or more scripts, or source code, and vice versa, where appropriate.

The present disclosure encompasses all changes, substitutions, variations, alterations, and modifications to the example embodiments herein that a person having ordinary skill in the art would comprehend.

What is claimed is:

1. A method for processing game operations during execution of an online game, the method comprising:

accessing a social grid with relationship information;
executing a first game board for a first user and a second game board for a second user, wherein the first game board is managed by the first user and the second game board is managed by the second user, wherein the first game board is created a first time the first user plays the online game and the second game board is created a first time the second user plays the online game, wherein the social grid includes a social link between the first user and the second user in the online game;
presenting a request for assistance to the first user in the first game board, the request being generated in the second game board; and
upon detection of acceptance of the request by the first user, generating an animation in the second game board presenting a sequence of images that appear as an action performed by the first user in the second game board, the action occurring without the first user accessing the second game board, wherein the action performed in the second game board completes at least one task associated with the request for assistance, wherein at least one operation of the method is executed by a processor.

2. The method as recited in claim 1, wherein the first user is executing the first game on a first computer with a first display, and the second user is executing the second game board on a second computer with a second display.

3. The method as recited in claim 2, wherein the sequence of images is shown in the second display and the sequence of images is not shown in the first display.

4. The method as recited in claim 1, wherein the request for assistance is a request for help to make progress in a mission present in the second game board.

5. The method as recited in claim 1 further including:
executing a visual indicator in the second game board to signal that the first user is active in the first game board, the visual indicator representing existence of a synchronous mode of play between the first user and the second user, wherein the request for assistance is generated while in synchronous mode.

6. The method as recited in claim 1 further including:
presenting a news update in the first game board notifying of progress of the second user in the second game board.

7. The method as recited in claim 1, wherein the first game board represents a city, wherein progress in the game includes adding a building to the city.

8. The method as recited in claim 1, wherein the first user is executing the first game on a first computer with a first display, and the second user is executing the second game board on a second computer with a second display, the method further including:
receiving a request to visit the first game board from the second user;
loading the first game board in the second display; and
displaying an icon associated with the second user in the first display, wherein the icon tracks actions taken by the second user in the first game board.

9. The method as recited in claim 1, wherein operations of the method are performed by a computer program when executed by one or more processors, the computer program being embedded in a non-transitory computer-readable storage medium.

10. The method as recited in claim 1, wherein each game board is a user interface for playing the online game for a respective user, each game board including a virtual stage for playing the online game, wherein completion of the task results in progress for the second user in the online game.

11. A system for processing game operations during execution of an online game, the system comprising:
a live interaction server that establishes an synchronous mode of play when a first user and a second user play the online game at a same time, and an asynchronous mode of play when the first user and the second user are not playing the online game at the same time; and
a game server having a processor that executes a computer program that performs a method, said method comprising,
executing a first game board for a first user and a second game board for a second user, wherein the first game board is managed by the first user and the second game board is managed by the second user, wherein each game board is a user interface for playing the online game for a respective user, each game board including a virtual stage for playing the online game;
presenting a request for assistance to the first user in the first game board while in synchronous mode, the request being generated in the second game board; and
upon detection of acceptance of the request by the first user, generating an animation in the second game board presenting a sequence of images that appear as an action performed by the first user in the second game board, the action occurring without the first user loading the second game board, wherein the action performed in the second game board completes at least one task associated with the request for assistance, wherein completion of the task results in progress for the second user in the online game.

12. The system of claim 11, further including:
a social networking server that provides social information.

13. The system of claim 12, wherein the live interaction server gets information from the game server regarding users actively playing the online game, wherein the live interaction server gets information from the social networking server regarding social relations of the users actively playing the online game.

14. The system of claim 13, wherein the live interaction server notifies the game server when peers of the first user are actively playing the game, wherein the game server notifies the first user in the first game board of the peers of the first user that are actively playing the game.

15. The system of claim 11, wherein the live interaction server periodically polls the game server requesting information on users playing the online game.

16. A method for processing game operations during execution of an online game, the method comprising:
executing a first game board for a first user and a second game board for a second user, wherein the first game board is managed by the first user and the second game board is managed by the second user, wherein each game board is a user interface for playing the online game for a respective user, each game board including a virtual stage for playing the online game;
executing a visual indicator in the second game board to signal that the first user is active in the first game board, the visual indicator representing existence of a synchronous mode of play between the first user and the second user;
presenting a request for assistance to the first user in the first game board, the request being generated in the second game board, wherein the request for assistance is generated while in synchronous mode; and upon detection of acceptance of the request by the first user, generating an animation in the second game board presenting a sequence of images that appear as an action performed by the first user in the second game board, the action occurring without the first user loading the second game board, wherein the action performed in the second game board completes at least one task associated with the request for assistance, wherein completion of the task results in progress for the second user in the online game, wherein operations of the method are executed by a processor.

17. The method as recited in claim 16, wherein the first user is executing the first game on a first computer with a first display, and the second user is executing the second game board on a second computer with a second display, the method further including:

receiving a request to visit the first game board from the second user;

loading the first game board in the second display; and displaying an icon associated with the second user in the first display, wherein the icon tracks actions taken by the second user in the first game board.

18. The method as recited in claim 17 further including:

executing a third game board for a third user;

receiving a request to visit the first game board from the third user while displaying the first game board in the second display; and displaying a third user icon associated with the third user in the first display, wherein the third user icon tracks actions taken by the third user in the first game board.

19. The method as recited in claim 18, wherein the first user has a role of a cop, the second user has a role of a bandit, and the third user has a role of a broadcaster.

20. The method as recited in claim 16, wherein operations of the method are performed by a computer program when executed by one or more processors, the computer program being embedded in a non-transitory computer-readable storage medium.

* * * * *